United States Patent [19]

Gesslauer

[11] Patent Number: 4,694,376

[45] Date of Patent: Sep. 15, 1987

[54] CIRCUIT FOR THE PULSED OPERATION OF ONE OR MORE HIGH-FREQUENCY OZONIZERS

[76] Inventor: Rudolf Gesslauer, Waldstr. 6, 3501 Schauenburg, Fed. Rep. of Germany

[21] Appl. No.: 781,201

[22] Filed: Sep. 26, 1985

Related U.S. Application Data

[63] Continuation of Ser. No. 471,358, Mar. 2, 1983, abandoned.

[30] Foreign Application Priority Data

Mar. 12, 1982 [DE] Fed. Rep. of Germany ....... 3208895

[51] Int. Cl.⁴ .............................................. B03C 3/01
[52] U.S. Cl. ..................................... 361/235; 55/139; 323/903; 422/186.16
[58] Field of Search ....................... 361/229, 230, 235; 55/105, 139; 323/903; 422/186.16

[56] References Cited

U.S. PATENT DOCUMENTS

| | | | |
|---|---|---|---|
| 3,784,838 | 1/1974 | Lowther | 422/186.16 |
| 3,877,896 | 4/1975 | Muskovac | 323/903 X |
| 3,905,920 | 9/1975 | Botcharoff | 361/231 X |
| 3,984,215 | 10/1976 | Zucker | 55/139 X |
| 4,117,527 | 9/1978 | Demarest et al. | 361/103 |
| 4,306,271 | 12/1981 | Weber | 361/235 X |
| 4,410,849 | 10/1983 | Ando | 323/903 X |
| 4,495,043 | 1/1985 | Marets | 361/235 X |
| 4,502,002 | 2/1985 | Ando | 323/903 X |

FOREIGN PATENT DOCUMENTS 2610809 9/1976 Fed. Rep. of Germany .
2620540 11/1976 Fed. Rep. of Germany .

Primary Examiner—L. T. Hix
Assistant Examiner—D. Rutledge

[57] ABSTRACT

Circuit for the pulsed operation of one or more high frequency ozonizers, having at least one power supply producing a direct current, having a number of circuits corresponding to the number of ozonizers for the derivation of electrical pulses from the direct current, and having a number of high voltage transformers corresponding to the number of the ozonizers, to whose primary side the pulses produced by each of the circuits are fed and whose secondary side is connected each to an ozonizer. The circuits contain, in accordance with the invention, a pulse width control triggered by an oscillator.

11 Claims, 6 Drawing Figures

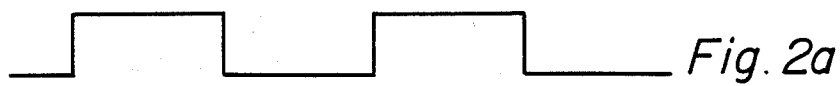
_Fig. 2a_
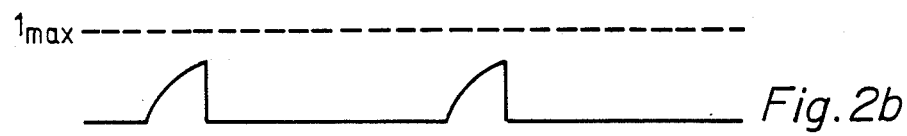
_Fig. 2b_
_Fig. 2c_
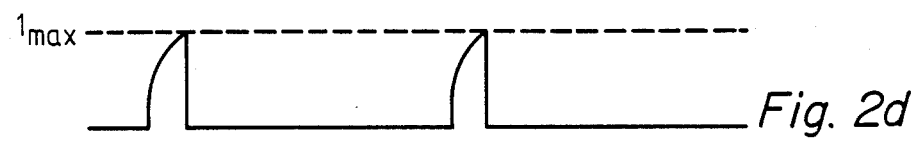
_Fig. 2d_
_Fig. 2e_

CIRCUIT FOR THE PULSED OPERATION OF ONE OR MORE HIGH-FREQUENCY OZONIZERS

This application is a continuation of application Ser. No. 471,358, filed Mar. 2, 1983, now abandoned.

BACKGROUND OF THE INVENTION

For the purification and sterilization of water, especially drinking water, not only chlorine and other chemicals can be used, but also and especially ozone. Therefore numerous water purification apparatus are already known, which have ozonizers for the production of ozone and have many advantages over conventional apparatus operating with chlorine. Their disadvantage is that heretofore large stationary plants have been used almost exclusively, which involve not only considerable complexity of manufacture and high maintenance costs, but also require the employment of trained operating personnel and therefore high consequential costs. The same applies to plants in which ozone is used for other purposes.

One especially important component of an effective purification plant is the ozonizer, which consists of a gas discharge tube in which ozone is produced by a silent discharge. The gas discharge tube contains two tubular, coaxially disposed electrodes whose confronting surfaces define a discharge zone within which at least one electrode is provided with a dielectric coating of glass or ceramic, and one of which is grounded and the other is connected to a high voltage.

For the production of the high voltage and for the operation of such ozonizers, two kinds of circuits have been used. According to one known proposal (DE-OS No. 2,620,540), a direct current from a mains-operated power supply is converted to electrical pulses by means of a thyristor and an oscillator connected to its control electrode. These pulses are delivered to the primary coil of a high-voltage transformer, such as for example an autotransformer, whose secondary side is connected to the electrodes of the ozonizer. The other known circuit (DE-AS No. 2,610,809) contains a high-voltage pulse generator and two high-voltage DC power supplies.

When a plurality of ozonizers are being operated simultaneously, it is desirable to arrange the circuitry such that it can be adapted individually, by individual control of the duty ratio, i.e., the quotient of the width and period of the pulses produced, so as to be able to operate each of the ozonizers at its best efficiency. This requirement is mainly due to the fact that the ozonizers obtainable on the market are very different and therefore the ozone yield of each ozonizer when connected to a standardized circuit can be very different. When the first-named circuit (DE-OS No. 2,620,540) is used, such adaptation is not possible. The other circuit (DE-AS No. 2,610,809) does contain a pulse generator with an adjustable duty ratio, which could be adjusted individually to adapt the circuit to the ozonizer used in the particular case. Such circuits, however, are on the one hand very complex and, on account of the high costs, they are appropriate only for large plants. On the other hand, if a plurality of ozonizers is used, only the two possibilities exist, either of providing a separate circuit for each individual ozonizer so as to adjust the duty ratio individually by means of each pulse generator, or to operate all of the ozonizers with the same circuit. In the first case, the manufacturing costs would be further increased, which is not acceptable, while in the second case no individual adjustment of the duty ratio would be possible, so that at least some of the ozonizers would be operated at poor efficiency.

As a result of this development, large stationary apparatus have been known, which have to be installed and operated with a great deal of technical complexity and expense, while on the other hand, small and medium apparatus, such as are desirable for small swimming pools, fish breeding tanks or transportable drinking water purification equipment, are operated exclusively with circuits having high-voltage transformers and permit no optimization of the efficiency of the ozonizers.

The invention therefore sets out from a circuit for the pulsed operation of one or more high frequency ozonizers, which has at least one DC power supply, a number of circuits, corresponding to the number of ozonizers, for the derivation of electrical pulses from the direct current, and a number of high voltage transformers corresponding to the number of ozonizers, to whose primaries the pulses produced from each one of the circuits are delivered and whose secondaries are connected each with one ozonizer.

It is the object of the invention to improve this circuit such that, with the use of commonly available and therefore economical components, it will permit a simple and optimum adaptation to the ozonizers used in each case, in accordance with the amounts of ozone desired, will be suitable especially for small and medium capacity ozonizers of up to about ten grams of ozone per hour, and will permit the addition, by modular expansion, of a plurality of ozonizers and hence a corresponding multiplication of the amount of ozone that can be produced.

THE INVENTION

For the solution of this problem, the invention is characterized by the fact that each of the circuits contains a pulse width control which is triggered by an oscillator.

The invention offers a number of advantages. On account of the use of a high voltage transformer—one similar to a television flyback transformer, for example—a thoroughly proven, mass-produced component can be used instead of one which, in conventional apparatus of low and medium power, is especially subject to trouble, it being necessary only to adapt the primary winding to the voltage available or desired in the particular case in order to assure the trouble-free continuous-duty operation of the entire ozone apparatus. The cyclical or pulsed operation of the high voltage transformer leads to a great steepness of the flanks of the virtually square-wave pulses and thus also to a rapid refiring of the gas discharge tube at relatively low voltage, and thus makes possible a high yield of energy as regards the production of ozone, i.e., a high efficiency. It is furthermore possible by controlling the pulse width to vary the load on each individual high voltage transformer and thus to control individually the amount of energy expended, which formerly has been possible only by varying the voltage amplitude, that is, by varying all of the ozonizers equally. It is advantageous, furthermore, that the power supply need only supply a direct current. Lastly, the pulse width controls permit an optimum adjustment of the efficiencies of all of the ozonizers available, while at the same time permitting the amounts of ozone produced to be varied by varying the output voltage of the power supply. Additional advantageous features of the invention are set forth in the subordinate claims.

BRIEF DESCRIPTION OF THE DRAWINGS

FIGS. 2a to 2e are graphic representations of the shapes of the pulses occurring at selected points of the circuit of FIG. 1 when the circuit is in operation.

DETAILED DESCRIPTION OF PREFERRED EMBODIMENTS

Figure 1:
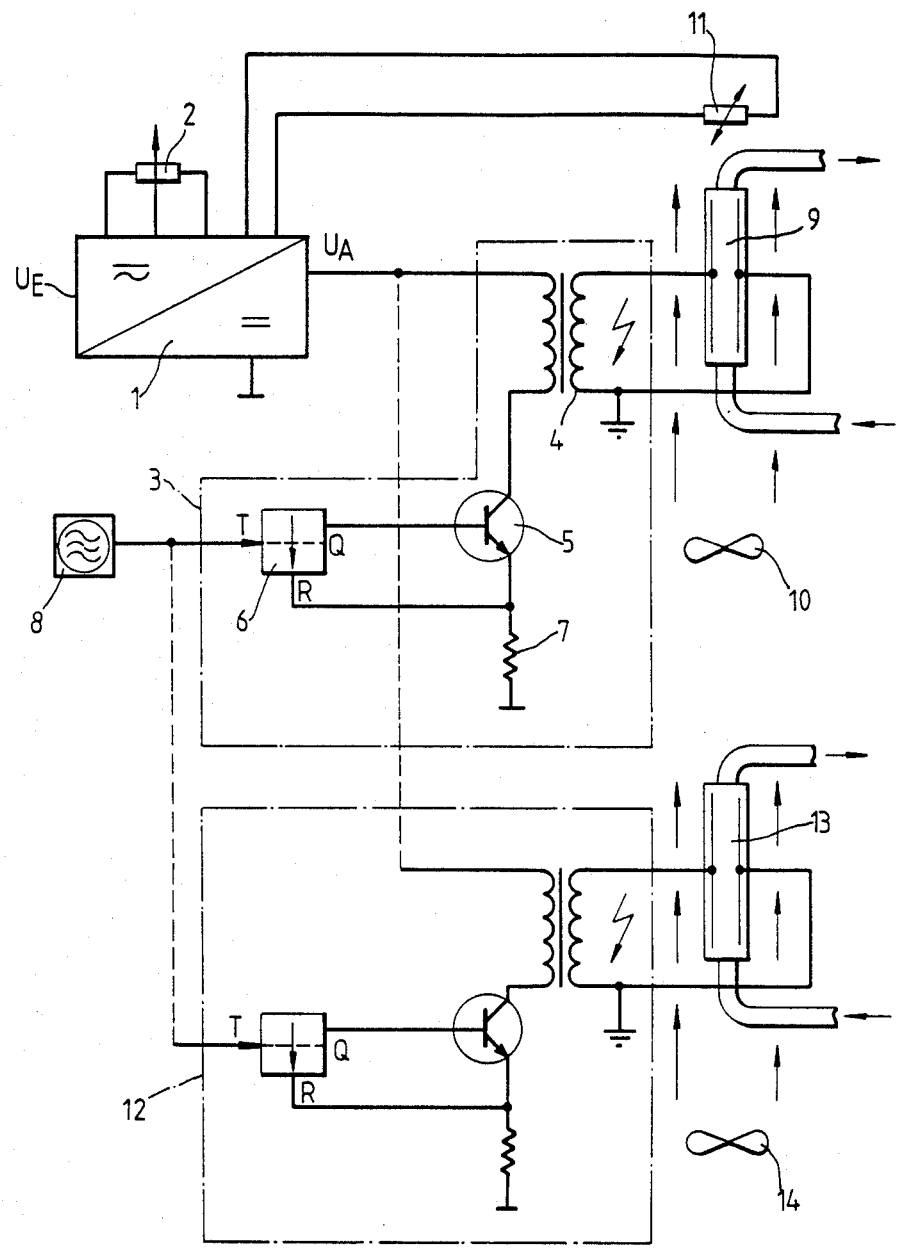
FIG. 1 is a schematic diagram of a circuit in accordance with the invention.

The circuit contains a power supply 1 producing from any desired input voltage of, for example, 220 V, 50 Hz, or 115 V, 60 Hz, or 12 VDC, a stabilized output direct current voltage $U_A$, which can be adjusted by means of the potentiometer 2 to levels from 130 V to 160 V. The direct current $U_A$ serves to supply a power amplifier 3, which contains a high voltage transformer 4, a pulse width control formed of an electronic switch 5, a monostable multivibrator 6 and a resistance 7, and is cycled or triggered by an oscillator 8 with an output frequency of, for example, 10 kHz. In the embodiment represented, the direct current $U_A$ is delivered to the one terminal of the primary winding of the high voltage transformer 4, while the other terminal of the primary winding is connected to the collector of a switching transistor forming the switch 5, whose emitter is grounded through the resistance 7. The base of the switching transistor is connected to the set output Q of the monostable multivibrator 6 whose trigger input T is connected to the output of the oscillator 8 and whose duty ratio is variable. The emitter of the switching transistor is furthermore connected to the reset input R of the monostable multivibrator 6.

The secondary winding of the high voltage transformer 4 is connected to the electrodes of a diagrammatically represented ozonizer 9. The outer wall of the gas discharge tube of the ozonizer 9 is surrounded by an aluminum heat sink of appropriate large surface area, which is not shown. The cooling is performed by a blower 10 which aspirates ambient air and blows it against the heat sink. A temperature sensor 11 is disposed in the cooling air stream following the heat sink and is connected to the control terminal of the power supply 1.

The high voltage transformer 4 consists, for example, of a flyback transformer commonly used in the television art, which is provided with an appropriately adapted primary winding, while the high voltage winding and the ferrite core are of the commonly marketed form. Whereas in television the primary winding is fed ordinarily with a voltage of 330 V, 15.6 kHz, the primary winding of the high voltage transformer 4 used in accordance with the invention is adapted such that it converts the voltage put out by the power supply to a high voltage of about 3000 V with the frequency of the oscillator 8 of 10 kHz. If the output voltage of the power supply 1 is 130 to 160 V, a primary winding of about 40 turns, for example, is used in a flyback transformer of the commonly known type.

The manner of operation of the circuit described is as follows:

After the apparatus is turned on, the direct-current voltage $U_A$ is applied to the primary winding of the high voltage transformer 4, while on the other hand the oscillator 8 is putting out square-wave pulses of the shape in FIG. 2a. The rise flanks of these square waves produce square-wave pulses of a defined length (e.g., approximately 30 microseconds) corresponding to shape in FIG. 2c at the output Q of the monostable multivibrator. The square-wave pulses of the monostable multivibrator 6 operate the switch 5, which blocks or releases the flow of current through the primary winding in accordance with the pulse shape in FIG. 2b, thereby causing energy to be transferred to the ferrite core and secondary winding of the high voltage transformer 4. The high voltage of about 3 kV thus produced serves to establish a silent discharge in the gas discharge tube of the ozonizer 9, so that a portion of the dried air flowing through it in the direction of the arrow is converted to ozone. If, due to abnormal circumstances, such as for example short-circuits or flashovers on the high voltage side, the flow of current through the primary winding should exceed a predetermined maximum $I_{max}$ (FIG. 2b), the voltage drop across the resistance 7 produces a premature restoration of the monostable multivibrator 6 and thus an immediate cut-off of the power input as indicated by curve in FIG. 2e, i.e., the previously established pulse width is reduced such that the current through the primary coil indicated by curve in FIG. 2d remains below the level of $I_{max}$. The power amplifier is thus protected against overload.

If the air flow through the ozonizer 4 is constant and the DC voltage $U_A$ is constant, the amount of ozone produced per hour is constant. This is on the condition, however, that the temperature of the ozonizer 9 does not substantially vary, because as the temperature rises the rate of recombination of ozone to oxygen increases and thus the amount of ozone produced diminishes. The temperature of the ozonizer, however, varies both according to how great a portion of the energy released in the ozonizer is converted to heat, and particularly according to the ambient temperature and the pattern of flow of the cooling air provided by the blower 10. In order nevertheless to make it possible to maintain the constancy of the amount of ozone produced per hour, the power supply 1 is of the regulated type and is provided with a control input for the connection of the temperature sensor 11. The regulation is accomplished as follows: the DC voltage $U_A$ increases as the exhaust air temperature increases, but is reduced as the exhaust air temperature diminishes. The temperature sensor 11 and the power supply are thus parts of a regulator whose operation is based on the ozone production.

In this kind of control, a single elevation or reduction of the exhaust air temperature would have to result in an avalanche-like increase or reduction of the DC voltage $U_A$ on account of the increase or reduction of the DC voltage $U_A$ and the correspondingly increased or reduced heat yield of the ozonizer. However, it has been found that, in the case of good cooling (e.g., 25 m³/h per ozonizer), such an avalanche effect does not occur, because the temperature change brought about in ozonizer 9 by an increase or reduction of the DC voltage $U_A$ apparently does not suffice to produce a substantial temperature change at the location of the temperature sensor 11.

If the maximum cooling air temperature of, for example, 50° C. should be exceeded, due for example to failure of a blower, the preset ozone production can no longer be reached even if the DC voltage $U_A$ is raised to its maximum. In this case, a thermoswitch, provided, for example, on the heat sink of the ozonizer 4, will respond, and will shut off the entire circuit and, if necessary, actuate an alarm system or the like.

The amount of ozone delivered by the ozonizer 4 can be continuously adjusted from, say, 30% to 100% of the rated power by operating the adjusting potentiometer 2.

On account of the relatively high operating frequency of about 10 kHz and the steep flanks of the high voltage, on the one hand the efficiency of the ozone production, i.e., the amount of ozone obtained per unit of energy, is great, while on the other hand, in comparison to the conventional 50 Hz apparatus, a high voltage of only 3 kV is required for the same output, in comparison with 10 to 20 kV. This brings about the special advantage that, for the production of an ozone output of, for example, 10 g/h, gas discharge tubes of comparatively small size (say, 20×200 mm) will suffice, which on the one hand permits easy air cooling, and on the other hand permits the use of ceramic instead of glass as dielectric. Neither of these is possible in the case of gas discharge tubes of this power operated in the conventional manner, on account of the excessively great dimensions. Ceramic also has the advantage that it can be made with better thermal conductivities and higher dielectric constants than glass, the better thermal conduction favoring the air cooling, while the higher dielectric constant permits a still greater reduction of the high voltage required while at the same time increasing the stability of the gas discharge tube on account of greater wall thicknesses.

On account of the high operating frequency of about 10 kHz it is furthermore possible to use the ferrite core and the high voltage winding of a conventional television flyback transformer. Since the high voltage winding in the television receiver has to have a voltage output of about 12 kV, but in the circuit of the invention it has to deliver only about 3 kV, the reliability of operation is extraordinarily great and even far greater than in television. The number of turns of the high voltage winding of the flyback transformer is around one thousand, which corresponds to a turns-to-voltage ratio of about 0.3:1. Consequently, only a few layers of relatively heavy wire are needed. Moreover, the high voltage transformer as a whole is small, light, and, being a mass-product, is inexpensive.

According to an especially preferred embodiment of the invention, the circuit of FIG. 1 contains, in addition to the power amplifier 3, at least one additional, similar power amplifier 12, which has a similar pulse width control connected in parallel and serves for the simultaneous or selective operation of an additional ozonizer 13. It is especially advantageous to combine all of the power amplifiers 3 and 12, ozonizers 9 and 13 and the corresponding blowers 10 and 14 modularly into finished component units, all these units being able to be housed in a common casing according to the maximum power that is required. In this manner virtually any desired amount of ozone can be produced easily, with air cooling only, and at low cost on account of the modular method of assembly, the space required for a module being small so that several modules can be housed in a common casing.

All modules can be operated with the same oscillator 8 and the same power supply 1. It is also, however, possible to provide each module with a separate power supply 1 so as to be able to adjust each ozonizer individually as needed and to regulate each power supply by means of a corresponding temperature sensor 11. It is then desirable for the pulse width of the pulses put out by each pulse width control to be adjusted to the level that is best for the efficiency of the corresponding ozonizer and to use the output voltage of the power supply to establish the desired rate of production of ozone. In addition, the modular method of assembly has the additional advantage that the failure of one module does not affect the operation of the other modules and in such cases the entire plant will remain in operation, although at reduced output.

The high voltages expressed in kilovolts are to be understood as effective voltages.

I claim:

1. A circuit arrangement for the pulsed operation of a plurality of high frequency ozonizers of a given type but each of which may have different characteristics due to manufacturing differences caused by manufacturing tolerances, comprising; a DC voltage supply means having at least one output for delivering a DC voltage and an adjusting means for adjusting said DC voltage; a frequency control means connected to all of said ozonizers for producing current pulses of a defined frequency to all of said ozonizers; a plurality of high voltage transformers, each transformer having a primary winding coupled to an output of said DC voltage supply means and a secondary winding coupled to a respective one of said ozonizers; and a plurality of pulse width control circuits, each circuit associated with one of said ozonizers for controlling the transformer of each ozonizer to operate at a preselected repetition frequency and at a preselected duty ratio adjusted a predetermined amount and causing each ozonizer to operate at an optimum energy output efficiency, said plurality of ozonizers each having its high voltage transformer primary winding connected to said power supply and its pulse width control circuit connected to said frequency control means so that said ozonizer connections to said power supply and to said frequency control means are parallel with each other to be operated by said frequency control means and said power supply, each pulse width control circuit deriving electrical current pulses of a preselected repetition frequency from said DC voltage supply means and delivering said current pulses through a respective one of said primary windings, and each pulse width control circuit including said respective primary winding and an individual pulse width control means for each circuit having an electronic switch for deriving said electrical current pulses by blocking or releasing a flow of a DC current from its output through said respective primary winding and each circuit further having means coupled to said electronic switch for alternately switching said switch into a blocking or a releasing condition at said pre-selected repetition frequency and at a pre-selectable duty ratio such that said current pulses may be delivered through each of said primary windings at pre-selectable duty ratios, wherein said adjusting means serve to adjust a desired overall amount of production of ozone per time unit from all of said ozonizers by adjusting the same DC voltage for all of said primary windings, whereby said pulse width control means serve to individually control the amount of energy expended for each of said ozonizers.

2. A circuit arrangement for the pulsed operation of a plurality of high frequency ozonizers of a given type but each of which may have different characteristics due to manufacturing differences caused by manufacturing tolerances, comprising: a DC voltage supply means having output means for delivering a DC voltage; a frequency control means connected to all of said ozonizers for producing current pulses of a defined frequency to all ozonizers; a plurality of high voltage transformers, each transformer operating a respective one of said ozonizers and having a primary winding coupled to said output means of said DC voltage supply means and a secondary winding coupled to said respective one of said ozonizers; and a plurality of pulse width control circuits, each associated with one of said ozonizers for deriving electrical pulses at a same preselected repetition frequency but at individually preselected duty ratios from said output means of said DC voltage supply means and for delivering said derived current pulses through the primary winding associated therewith for controlling the transformer of each ozonizer to operate at a preselected repetition frequency and at a preselected duty ratio adjusted a predetermined amount and causing each ozonizer to operate at an optimum energy output efficiency, said plurality of ozonizers each having its high voltage transformer primary winding connected to said DC power supply means output means and its pulse width control circuit connected to said frequency control means so that said ozonizer connections to said DC power supply output means and to said frequency control means are in parallel with each other, each pulse width control circuit including a respective one of said primary windings, means connected to said frequency control means and producing said current pulses at said preselected same repetition frequency and preselecting means for providing said current pulses delivered through the respective one of said primary windings with said individually preselectable duty ratios, said DC voltage supply means having an adjusting means for adjusting said DC voltage for adjusting a desired overall amount of production of ozone from all of said ozonizers per time unit and wherein each of said preselecting means has a pulse width control means for individually preselecting the duty ratio of the current pulses delivered from a respective one of said circuits in dependence on the ozonizer coupled to the transformer comprising the primary winding of said respective circuit and thus serve to individually adjust the amount of energy expended for said ozonizer.

3. A circuit arrangement according to claim 2 wherein each of said pulse width control means has an electronic switch for blocking or releasing a flow of DC current from said output means of said DC voltage supply means through said respective primary winding and means coupled to said electronic switch for alternately switching said switch into a blocking or releasing condition at said preselected same repetition frequency and at said individually preselected duty ratio.

4. A circuit arrangement according to claim 3, wherein each of said means for alternately switching said electronic switch into a blocking or releasing condition includes a monostable multivibrator having an adjustable duty ratio, an output coupled to a respective one of said switches, and an input, and wherein a high frequency oscillator means is provided coupled to said inputs of said multivibrators.

5. A circuit arrangement according to claim 4, wherein said oscillator means has an oscillator common and coupled to said inputs of all said multivibrators.

6. A circuit arrangement according to claim 4 wherein each of said pulse width control circuits has a current limiter for limiting the current delivered through a respective primary winding, and in each of said current limiters is a resistor, wherein each of said multivibrators has a reset input and wherein each of said resistors is coupled between a respective one of said reset inputs and a respective one of said switches.

7. A circuit arrangement according to claim 2, wherein said DC voltage supply means consists of a DC voltage generator having a single output coupled to all of said primary windings such that the overall production of ozone produced by all of said ozonizers may be adjusted with only one adjusting means.

8. A circuit arrangement for the pulsed operation of a plurality of high frequency ozonizers of a given type but each of which may have its own individual characteristics due to manufacturing differences caused by manufacturing tolerances, comprising: a DC power supply for delivering power to each of said plurality of ozonizers; frequency control means connected to all of said plurality of ozonizers for producing current pulses of a defined frequency to all ozonizers; each ozonizer including a high voltage transformer having a primary winding connected to said DC power supply for operating each ozonizer; a plurality of ozonizer energy control means, each associated with one ozonizer of said plurality of ozonizers, each of said ozonizer energy control means having a pulse width control circuit connected to the transformer of said one ozonizer for controlling the transformer of each ozonizer to operate at a preselected repetition frequency and at a preselected duty ratio adjusted a predetermined amount and causing each ozonizer to operate at an optimum energy output efficiency, said plurality of ozonizers each having its high voltage transformer primary winding connected to said power supply and its pulse width control circuit connected to said frequency control means so that said ozonizer connections to said power supply and to said frequency control means are in parallel with each other; each of said pulse width control circuits including a pulse width control means connecting said frequency control means to the individual transformer of said one ozonizer for deriving electrical pulses of predefined length by blocking and releasing a flow of DC current through the individual transformers, and electronic switch means connected to the individual transformer for blocking and releasing the delivery of said predefined length electrical pulses to the individual transformer.

9. A circuit arrangement according to claim 2, wherein each of said pulse width control circuits has a current limiter for limiting the current delivered through said respective primary winding.

10. A circuit arrangement according to claim 2, wherein said ozonizers are provided with cooling means for producing a cooling air stream flowing past said ozonizers, wherein said DC power supply has at least one control input and wherein at least one temperature sensor is provided, said temperature sensor being connected to said control input and being located within said cooling air stream and behind a respective one of said ozonizers for sensing the temperature thereof and for deriving a control signal for controlling said DC power supply such that the DC output at said output means thereof increases when the sensed temperature increases and decreases when the sensed temperature decreases in order to substantially keep constant the overall amount of production of ozone from all of said ozonizers per time unit.

11. A circuit arrangement according to claim 8, wherein at least one said high voltage transformers is made in the manner of a television flyback transformer.

* * * * *